E. LUNA.
CULINARY ARTICLE.
APPLICATION FILED OCT. 13, 1917.
1,303,083.
Patented May 6, 1919.
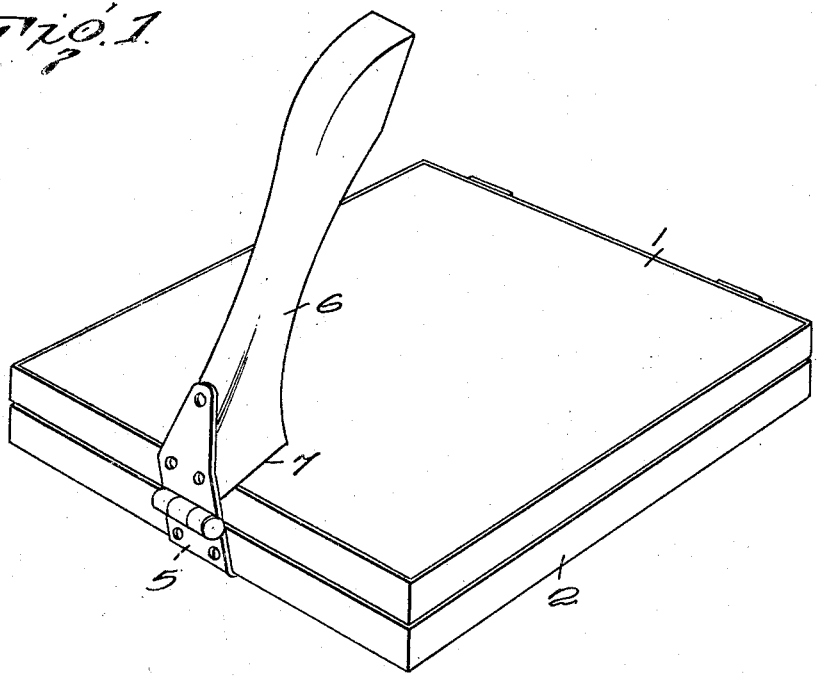
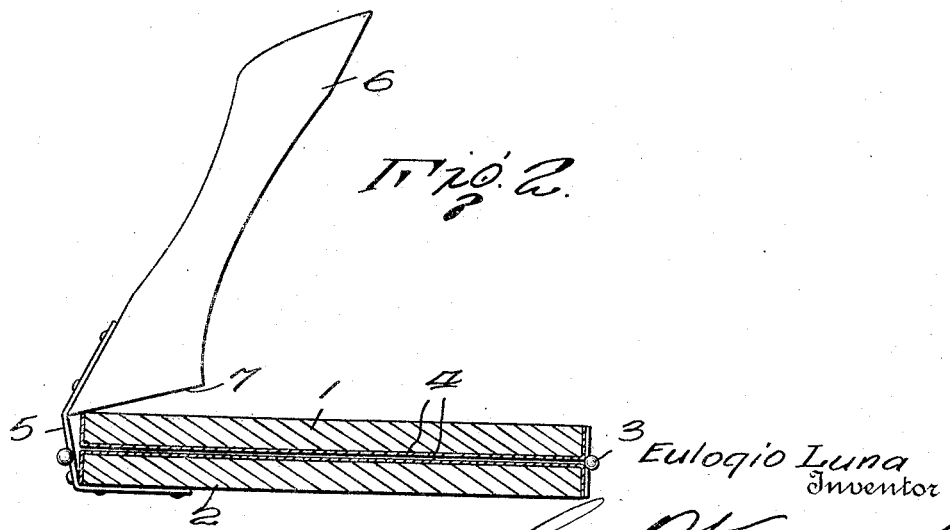
Eulogio Luna
Inventor
By Geo. P. Kimmel
Attorney

UNITED STATES PATENT OFFICE.

EULOGIO LUNA, OF CLIFTON, ARIZONA.

CULINARY ARTICLE.

1,303,083.  Specification of Letters Patent.  Patented May 6, 1919.

Application filed October 13, 1917. Serial No. 196,510.

*To all whom it may concern:*

Be it known that I, EULOGIO LUNA, a citizen of the United States of Mexico, residing at Clifton, in the county of Greenlee and State of Arizona, have invented certain new and useful Improvements in Culinary Articles, of which the following is a specification.

This invention relates to culinary articles and it is the dominant object of the invention to provide a device for mixing and shaping Mexican nixtamal tortillas for enchiladas, tamales, gorditas de cuajada, pan de maiz, and other Mexican pastry edibles made from nixtamal.

As is known, the present method of making tortillas or "flap-jacks" by hand manipulation is exceedingly tedious and tiresome, and as a consequence, people, rather than make the same, buy them from venders, commonly called "Mexican tortilleras." However, with the improved device, the labor and drudgery incident to the making of these pastries is eliminated, the operation being easily and rapidly performed thereby.

The improvements in the details and arrangement of parts will be apparent from an inspection of the accompanying drawings in connection with the specific description hereinafter contained, and wherein the preferred embodiment of the invention is disclosed for the purpose of imparting a full understanding of the same.

In the drawings:—

Figure 1 is a perspective of the improved culinary article; and

Fig. 2 is a vertical transverse section therethrough.

Referring more specifically to the drawings, wherein like reference characters designate corresponding parts in the several views, 1 and 2 represent compressing boards, which boards having the rear ends of the same hingedly connected as at 3 and have the adjacent faces thereof covered with sheet metal 4 or other suitable material. However, in this connection, it is to be understood that the adjacent surfaces of the compressing boards 1 and 2 may be polished and thereby eliminate the use of the sheet metal coverings 4.

A hinge 5 has one leaf of the same secured to the forward marginal edge of the compressing board 2 while the remaining leaf thereof is extended above the compressing board 1 and engaged with a lever 6, the lower portion of which is provided with a beveled portion 7 adapted to be engaged over the adjacent portion of the compressing board 1. Obviously, by engaging the beveled portion 7 of the lever 6 with the compressing board 1 and locking the same, the boards 1 and 2 will be compressed, thereby properly mixing and shaping the pastries arranged between the same. After the edibles have been properly shaped between the compressing boards 1 and 2 the lever 6 may be swung to its inoperative or disengaged position and the said edibles removed from the article for cooking.

From the foregoing, it will be readily understood by those skilled in the art that with my improved culinary implement, Mexican pastry edibles made from nixtamal may be mixed and shaped in a rapid and effective manner and without the drudgery heretofore attached to the making of the same. Thus, the device is rendered particularly desirable for commercial use as well as home use.

Manifestly, the construction shown is capable of considerable modification and such modification as is within the scope of claim, I consider within the spirit of my invention.

I claim:—

A device of the character described, including complemental hingedly connected compressing boards, covering for the adjacent faces of said boards, a lever pivotally connected to the forward marginal edge of one of the boards provided with a beveled lower portion engageable with the adjacent portion of the remaining board for compressing the same.

In testimony whereof, I affix my signature hereto.

EULOGIO LUNA.

Copies of this patent may be obtained for five cents each, by addressing the "Commissioner of Patents, Washington, D. C."